United States Patent [19]

Keen

[11] Patent Number: 4,816,877

[45] Date of Patent: Mar. 28, 1989

[54] REFILLABLE TONER CARTRIDGE AND METHOD OF MANUFACTURE THEREOF

[76] Inventor: Fred Keen, 64 Oak Ave., Tenafly, N.J. 07670

[21] Appl. No.: 160,118

[22] Filed: Feb. 25, 1988

[51] Int. Cl.[4] ........................ G03B 00/00; G03G 15/00

[52] U.S. Cl. ................................ 355/133; 355/3 DD; 222/DIG. 1

[58] Field of Search .................... 355/3 DD, 133, 3 R; 222/DIG. 1

[56] References Cited

U.S. PATENT DOCUMENTS

| | | | |
|---|---|---|---|
| 3,385,500 | 5/1968 | Lavander | 222/DIG. 1 |
| 3,618,826 | 11/1971 | Kangas et al. | 222/DIG. 1 |
| 4,062,385 | 12/1977 | Katusha et al. | 222/DIG. 1 |
| 4,089,601 | 5/1978 | Nayone | 355/3 DD |
| 4,491,161 | 1/1985 | Tamura et al. | 222/DIG. 1 |
| 4,523,834 | 6/1985 | Pelda et al. | 355/3 DD |
| 4,641,945 | 2/1987 | Ikesue | 355/3 DD |
| 4,650,070 | 5/1987 | Oka et al. | 222/DIG. 1 |
| 4,688,926 | 8/1987 | Manno | 355/3 DD |

*Primary Examiner*—R. L. Moses

*Attorney, Agent, or Firm*—W. Patrick Quast

[57] ABSTRACT

A refillable cartridge for a copier, laser printer or similar xerographic printing process device, is provided. A method of manufacture of the refillable cartridge is also provided. The cartridge of the invention includes an upper portion with an upper chamber for clean toner and includes a lower portion with a lower chamber for toner waste. The upper portion has a refill hole, opening into the upper chamber. The lower portion has a discharge hole opening into the lower chamber. The refill hole and the discharge hole have respective seal members. The method of manufacture of the cartridge includes the steps of mounting on a support a plastic cartridge having an upper portion with an upper chamber, forming a refill hole in the upper portion by using, for example a hot iron rod for heating the respective adjoining plastic portion until the refill hole is formed; and forming a discharge hole in the lower portion.

15 Claims, 2 Drawing Sheets

REFILLABLE TONER CARTRIDGE AND METHOD OF MANUFACTURE THEREOF

The invention relates to a refillable toner cartridge and the method of manufacture thereof, and in particular the invention relates to a refillable plastic toner cartridge and the method of manufacture thereof using a heated iron bar, or similar device.

BACKGROUND OF THE INVENTION

The xerographic printing process is now used for copying machines, laser printers, facsimile machines, and micrographic printers.

Canon Corp., for example, has developed a xerographic printing system in which many of the parts of the printer (photoreceptive drum, cleaning system, corona wires, etc.,) as well as the toner, are contained in a disposable cartridge. The advantages of this system are that the cost of the machine is reduced (as many parts are not in the machine, but in the cartridge) and the maintenance of the machine is greatly reduced The disadvantage of the system is that the cost of each copy is high because when the toner in the cartridge is depleted, the whole cartridge, including the parts in it, must be discarded, even though the parts might still be in good condition.

Attempts have been made to recycle the cartridge. Recyclers now operate who collect old cartridges, bring them to their workshops, and empty out waste toner and add new toner. They then deliver them back to the consumer.

End users attempt to do the same in the workplace, with obvious problems, particularly resulting from the inherent messiness of the procedure.

According to the present invention, a refillable toner cartridge is provided. This cartridge comprises a cartridge body, which has an upper portion with an upper chamber for clean toner, and which has a lower portion with a lower chamber for toner waste, wherein the upper portion has a refill hole with a seal member, and wherein the lower portion has discharge hole or a slot with a seal member.

By using the structure of the upper portion with a refill hole and seal member, and the lower portion with discharge holes and seal member, it overcomes the problem of returning the cartridge to the factory for refilling.

The above advantages and the subsequent description will be more readily understood by reference to the accompanying drawings.

Figure 2:
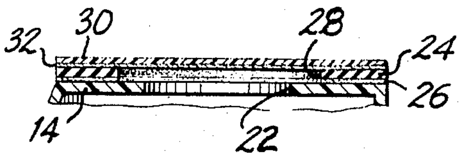
FIG. 2 is a section view as taken along the line 2—2 of FIG. 1A.
Figure 1:
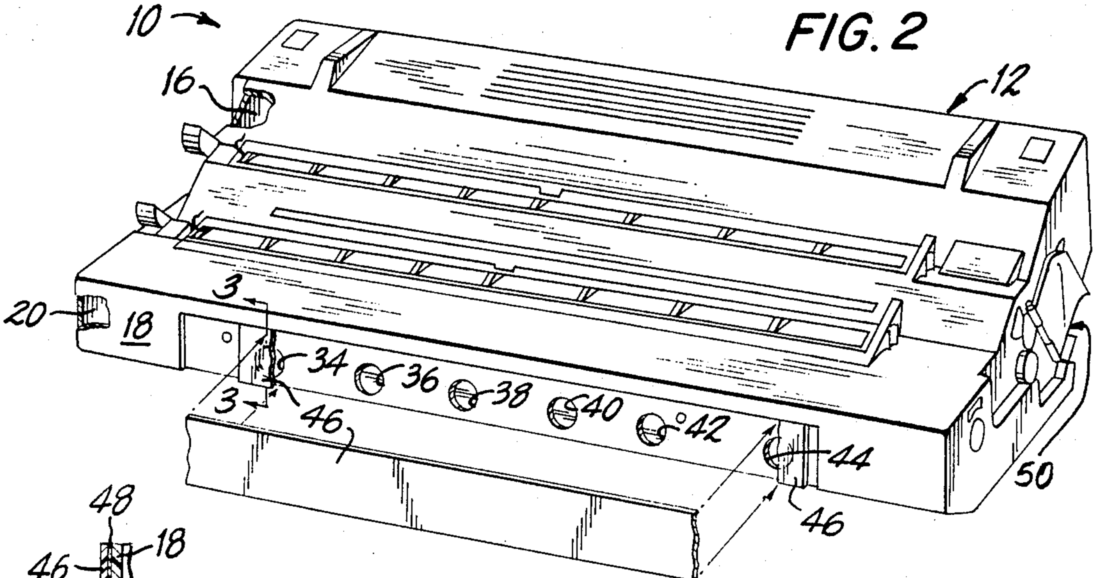
FIG. 1 is a perspective view of a refillable cartridge according to the invention.
Figure 3:
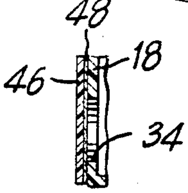
FIG. 3 is a section view as taken along the line 3—3 of FIG. 1.
Figure 1A:
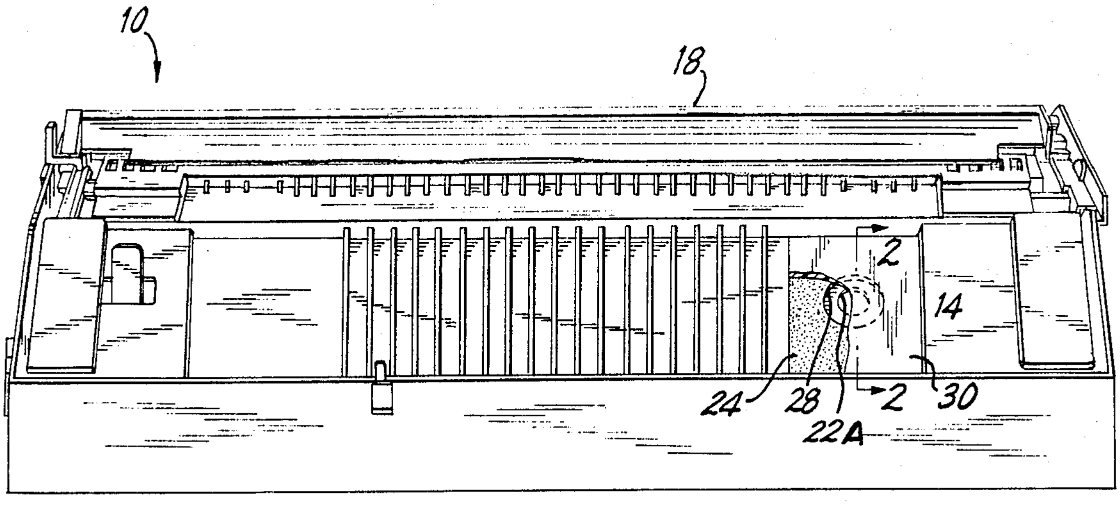
FIG. 1A is an elevation view of the cartridge of FIG. 1 as viewed from the underside of the cartridge as it is depicted in FIG. 1.

In FIGS. 1 and 1A there is depicted a refillable cartridge 10 for reproduction devices employing the xerographic process such as a copier, laser printer, facsimile machine, etc. Cartridge 10 has a cartridge body 12 which has an upper portion 14 with an upper chamber or clean toner hopper 16. Cartridge body 12 also has a lower portion 18 with a lower chamber or waste toner hopper chamber 20.

Upper portion 14 has a refill hole, or recharge hole or slot 22. Disposed over refill hole 22 is a washer or shim 24, which has an adhesive layer 26. Washer 24 has a washer hole 28. Washer 24 is covered by a seal member or closure member 30, which has an adhesive layer 32.

The washer hole 28 has a larger inside diameter than the refill hole 22. For the necessarily, particular hole forming process described below, hole 22 can have a roughened edge, 22A, which might impede a tight seal between shim 24 and the contacting surface of upper portion 14, if hole 28 had a smaller diameter, such that toner could contaminate the seal.

Lower portion 18 has a plurality of discharge holes or slots 34, 36, 38, 40, 42, 44, which are covered by a seal member or closure member 46, that has an adhesive layer 48.

The method of manufacture of cartridge 10 includes the steps of manufacture as indicated hereafter:

1. Mount on a support a plastic cartridge body 12, which has an upper portion 14 that has an upper chamber 16 for clean toner, and has a lower portion 18 that has a lower chamber 20 for toner waste.

2. Form a refill hole 22 in the upper portion 14, which opens into the upper chamber 16 using a hot iron rod or soldering iron, laser beam, or any technique which will preclude plastic waste from contaminating the clean toner in upper chamber 16.

3. Form discharge holes 34–44 in the lower portion 18, which open into the lower chamber 20, by drilling, boring, or melting holes using techniques described in step 2 above. Drilling or boring are acceptable techniques here, since the material in the lower chamber is typically discarded after recovery.

4. If the hole formed in step 2 above does not result in a smooth surface at the hole opening, then attach a washer 24 with an adhesive layer 26 to the upper portion 14 over the refill hole 22 with the washer hole 28 aligned axially with the refill hole 22.

5. Cover the refill hole 22 with a seal member 30 which has an adhesive layer 32.

6. Cover the discharge holes 34–44, with a seal member 46 which has an adhesive layer 48.

Assuming that a supplier has provided a refillable cartridge 10, together with four bottles of fresh toner, the installation of cartridge 10 in a copier or laser printer would be as indicated hereafter.

1. User would follow the same installation procedure for refillable cartridge 10 as for the prior art cartridge on the first cycle only.

2. User would follow the following procedure for the second cycle through the fifth cycle.

(a) Remove the cartridge 10 from the printer.

(b) Prepare room to work in an easily maintained area in case of spillage. Open a few large sheets of newspaper upon which to empty the waste toner.

(c) Working on the newspaper, peel off the long waste toner seal 46.

(d) Carefully turn the cartridge 10 so that the discharge holes 34, 36, 38, 40, 42, 44 face downward, and tap the cartridge 10 until the waste toner hopper 20 is empty.

(e) Fold the newspaper and place it in a plastic bag.

(f) Cover holes 34, 36, 38, 40, 42, 44 with a new waste toner seal 46.

(g) Orientate the cartridge 10 so that seal 30 is facing upward. Remove seal 30 exposing hole 22.

(h) Take a bottle of toner and shake it vigorously so that the toner is aerated. Remove the cap and safety seal. Screw on its pour spout.

(i) Raise the cartridge 10 at an angle, and carefully insert the opened spout into the refill hole 22. Empty the bottle into the toner hopper chamber 16. Remove the bottle from the cartridge 10. Discard the bottle when empty.

(j) Seal hole 22 with a new seal 30 which is provided.

(k) Install the refilled cartridge 10 into the printer.

There are a number of advantages to this invention as indicated hereafter.

1. A user of a refillable cartridge 10 avoids the problem of multiple shipments to the factory or supplier, for refilling the cartridge.

2. The user can refill the refillable cartridge 10 four to six times or cycles, or until the photosensitive drum or other components wear out.

3. The refillable cartridge 10 is environmentally less wasteful, and is more economical to use than the prior art cartridge.

4. While the prior art cartridge could be used only on about 3,000 copies, the present invention permits approximately 15,000 copies, based upon one new refillable cartridge 10 and four refills, thereby substantially reducing its per copy cost.

5. The user controls the refilling of cartridge 10, insuring an adequate quantity of new toner. Further, the user does not have to wait for the return of the cartridge from the factory or supplier.

6. In certain prior methods of refilling at the factory, certain internal spillage occurs during shipment. This is because an internal seal, 50, is removed by the user the first time a cartridge is used in order to "release" the toner for use by the machine. Of course, since the present invention allows practical use at the office, the problem of spillage in transit is eliminated.

Figure 4:
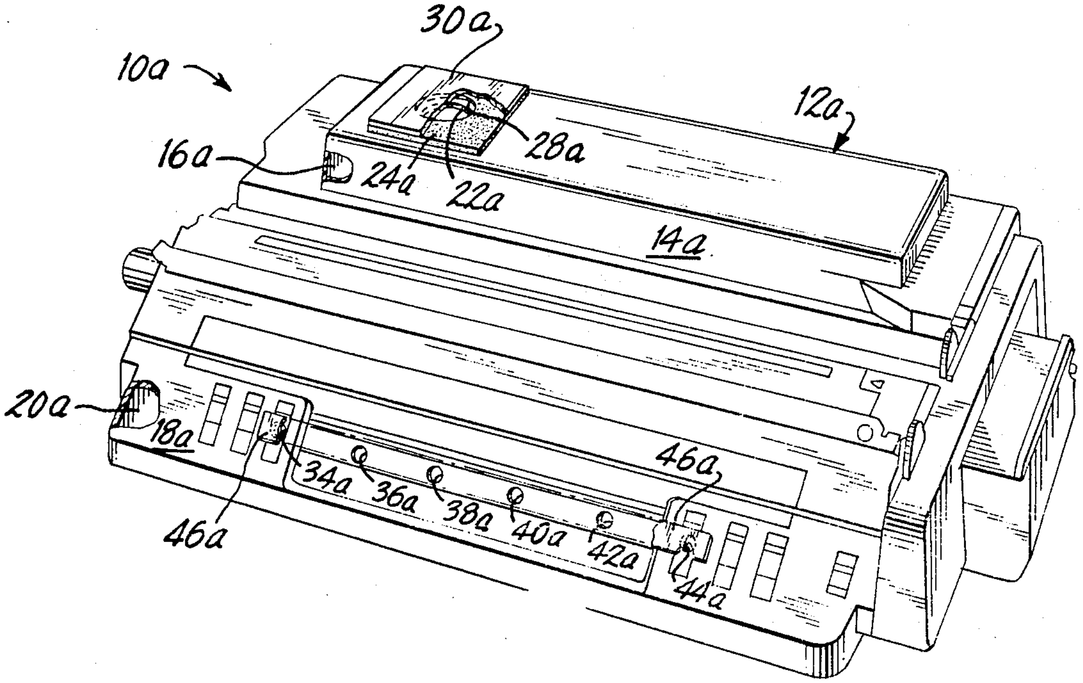
FIG. 4 is an alternate embodiment of the cartridge of FIG. 1.

In FIG. 4, an alternate embodiment of a refillable cartridge 10*a* is shown. Parts of FIG. 4, which are like parts of FIG. 1, have the same numerals, but with a subscript "*a*" added thereto.

Cartridge 10*a* has a body 12*a*, which has an upper portion 14*a* with an upper chamber 16*a*. Body 12*a* also has a lower portion 18*a* with a lower chamber 20*a*.

Upper portion 14*a* has a refill hole 22*a*, which has a washer 24*a* with an adhesive layer. Washer 24*a* has a washer hole 28*a*. Washer 24*a* is covered by a seal member 30*a* with an adhesive layer. Lower portion 18*a* has a plurality of discharge holes 34*a*, 36*a*, 38*a*, 40*a*, 42*a* and 44*a*, which are covered by a seal member 46*a*, that has an adhesive layer.

The method of manufacture of cartridge 10*a* is substantially the same as the method of manufacture of cartridge 10.

In FIG. 4, the seal member 46*a* extends lengthwise a sufficient distance to cover all of the discharge holes. In FIG. 4, only a portion of seal member 46*a* is shown.

While the invention has been described in its preferred embodiments, it is to be understood that the words which have been used are words of description rather than limitation and that changes may be made within the purview of the appended claims without departing from the true scope and spirit of the invention in its broader aspects.

For example, seals 30 and 46 can be another type of pressure sensitive tape, or a snap-in fitment or a screw-on plug, or the like.

Also, lower portion 18, which has the lower chamber or waste toner hopper chamber 20, can be a removable lower portion which is disposable, so that a new disposable lower portion can be inserted in the cartridge 10.

Further, seal members 30 or 30*a* can be made from a sufficiently permeable material to permit air to pass through, and not the toner particles. This allows cartridges in accordance with the invention to be forwarded by air transport.

The permeable material obviates toner leakage problems caused by depressurization if relatively, air impervious material is employed.

What is claimed is:

1. A method of manufacture of a refillable cartridge for a copier, laser printer or similar xerographic printing process device comprising the steps of:

mounting on a support a plastic cartridge used in said xerographic printing having an upper portion with an upper chamber for clean toner and having a lower portion with a lower chamber for toner waste;

forming a refill hole in the upper portion opening into the upper chamber; and forming a discharge hole in the lower portion opening into the lower chamber.

2. The method of claim 1, including the steps, of:

covering the refill hole with a seal member having an adhesive layer for attachment to the upper portion; and, covering the discharge hole with a seal member having an adhesive layer attached to the lower portion.

3. The method of claim 1, including the steps of:

attaching a refill washer with an adhesive layer and a washer hole to the upper body, with the washer hole axially aligned with the refill hole.

4. The method of claim 3 including the steps of:

covering the washer hole with a seal member having an adhesive layer for attachment thereto; and covering the discharge hole with a seal member having an adhesive layer attached to the lower portion.

5. The method of claim 4 wherein the perimeter edge of said refill hole is disposed within the perimeter edge of said washer hole.

6. The method of claim 3, wherein said step of forming the refill hole includes the operation of using a hot iron rod for heating the adjoining plastic portion of the cartridge until said refill hole is formed.

7. The method of claim 6 wherein the perimeter edge of said refill hole is disposed within the perimeter edge of said washer hole.

8. The methods of manufacture claimed in either claims 1, 2, 3, 4, 5, 6, or 7 wherein said plastic cartridge prior to the modification thereof by the steps set forth in the respective claim is the cartridge received from a supplier and ready for use in said xerographic printing process device.

9. A refillable cartridge for a copier, laser printer, or similar xerographic printing process device comprising:

a cartridge body having an upper portion with an upper chamber for clean toner and having a lower portion with a lower chamber for toner waste;

said upper portion having at least one refill hole opening into the upper chamber; and said lower portion having at lease one discharge hole opening into the lower chamber.

10. The cartridge of claim 9, wherein said upper portion has a refill washer with a washer hole, said washer hole being axially aligned with said refill hole.

11. The cartridge of claim 10, wherein said upper portion has a flexible seal member with an adhesive layer for sealing the refill hole and for covering said refill washer and wherein said lower portion has a flexible seal member with an adhesive layer for sealing the discharge hole.

12. The cartridge of claim 11, wherein said cartridge body is composed of a plastic material, said cartridge further including operational members necessary in the operation of the xerographic printing process device, said cartridge having a useable life of about five cycles of use in the xerographic printing process device, and wherein said upper chamber has a volume equal to about the volume of one refill, whereby a single refilled cartridge plus four quantities of refill toner will last approximately over the life of the plastic cartridge.

13. The cartridge of claim 10 wherein the perimeter edge of said refill hole is disposed within the perimeter edge of said washer hole.

14. The cartridge of claim 11 wherein the perimeter edge of said refill hole is disposed within the perimeter edge of said washer hole.

15. The cartridge of claim 12 wherein the perimeter edge of said refill hole is disposed within the perimeter edge of said washer hole.

* * * * *